(12) United States Patent
Blaabjerg et al.

(10) Patent No.: US 12,241,449 B2
(45) Date of Patent: Mar. 4, 2025

(54) METHOD FOR MANUFACTURING A WIND TURBINE AND WIND TURBINE

(71) Applicant: Siemens Gamesa Renewable Energy A/S, Brande (DK)

(72) Inventors: Hans Kjaer Blaabjerg, Gevded (DK); Thomas Smedegaard, Åbyhøj (DK); Manoj Kumar, Haryana (IN); Vipin Sendwal, Haryana (IN)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 230 days.

(21) Appl. No.: 17/427,153

(22) PCT Filed: Jan. 13, 2020

(86) PCT No.: PCT/EP2020/050706
§ 371 (c)(1),
(2) Date: Jul. 30, 2021

(87) PCT Pub. No.: WO2020/156793
PCT Pub. Date: Aug. 6, 2020

(65) Prior Publication Data
US 2022/0090579 A1 Mar. 24, 2022

(30) Foreign Application Priority Data
Jan. 31, 2019 (EP) .................................. 19154718

(51) Int. Cl.
*F03D 13/10* (2016.01)
*F03D 13/20* (2016.01)
*F03D 80/80* (2016.01)

(52) U.S. Cl.
CPC ............. *F03D 13/10* (2016.05); *F03D 13/20* (2016.05); *F03D 80/88* (2016.05); *F05B 2230/60* (2013.01); *F05B 2260/30* (2013.01)

(58) Field of Classification Search
CPC .................................. F03D 13/10; F03D 13/20
See application file for complete search history.

(56) References Cited

U.S. PATENT DOCUMENTS 10,669,994 B1 * 6/2020 Kucic ..................... F03D 13/10
2004/0169376 A1 9/2004 Ruer et al.
(Continued)

FOREIGN PATENT DOCUMENTS

BE 1025030 B1 10/2018
CN 102052261 A 5/2011
(Continued)

OTHER PUBLICATIONS

International Search Report and Written Opinion in corresponding PCT Patent Application No. PCT/EP2020/050706 dated Apr. 29, 2020; 13 pages.
(Continued)

*Primary Examiner* — Long T Tran
(74) *Attorney, Agent, or Firm* — Schmeiser, Olsen & Watts LLP

(57) ABSTRACT

A method for manufacturing a wind turbine, the method includes the steps of: a) manufacturing a bottom module, the bottom module including at least one first platform; b) manufacturing a top module, the top module includes at least one second platform; and c) assembling the bottom module and the top module to form a platform assembly is provided. Manufacturing the platform assembly from two separate modules allows to manufacture a higher platform assembly.

14 Claims, 9 Drawing Sheets

(56) References Cited

U.S. PATENT DOCUMENTS

| | | | |
|---|---|---|---|
| 2009/0308006 A1* | 12/2009 | Zavitz | E04B 1/20 52/745.03 |
| 2010/0135792 A1 | 6/2010 | Niehues | |
| 2011/0211914 A1* | 9/2011 | Palfinger | E02B 17/0034 405/196 |
| 2013/0067853 A1* | 3/2013 | Baker | F03D 13/22 52/745.17 |
| 2014/0077504 A1* | 3/2014 | Epstein | F03D 80/70 290/55 |
| 2015/0037166 A1* | 2/2015 | Venkatakrishnappa | F03D 80/88 52/651.01 |
| 2015/0345463 A1 | 12/2015 | Nielsen | |
| 2016/0229494 A1* | 8/2016 | Bergua | B63B 35/44 |
| 2017/0107977 A1 | 4/2017 | Hansen et al. | |
| 2017/0138351 A1* | 5/2017 | Tobinaga | F03D 80/82 |
| 2018/0087287 A1 | 3/2018 | Gremling | |
| 2018/0291869 A1* | 10/2018 | Sauer, Jr. | F03D 3/005 |
| 2018/0291874 A1* | 10/2018 | Sauer, Jr. | F03D 7/042 |
| 2019/0040844 A1* | 2/2019 | Da Silva | F03D 13/25 |
| 2019/0072078 A1* | 3/2019 | Munk-Hansen | F03D 80/88 |
| 2019/0301196 A1 | 10/2019 | Reed et al. | |
| 2020/0300224 A1* | 9/2020 | Syrovy | B63B 43/08 |
| 2020/0369495 A1* | 11/2020 | Strandberg | B66C 23/207 |
| 2021/0156365 A1* | 5/2021 | Eidam | F03D 80/85 |

FOREIGN PATENT DOCUMENTS

| | | |
|---|---|---|
| CN | 104619984 A | 5/2015 |
| CN | 106460782 A | 2/2017 |
| CN | 107532570 A | 1/2018 |
| EP | 3546742 A1 | 10/2019 |
| WO | 2013155521 A1 | 10/2013 |
| WO | 2015078476 A1 | 6/2015 |
| WO | 2018133965 A1 | 7/2018 |

OTHER PUBLICATIONS

Extended European Search Report in related European Patent Application No. 19154718.1 dated Jul. 25, 2019; 7 pages.

* cited by examiner

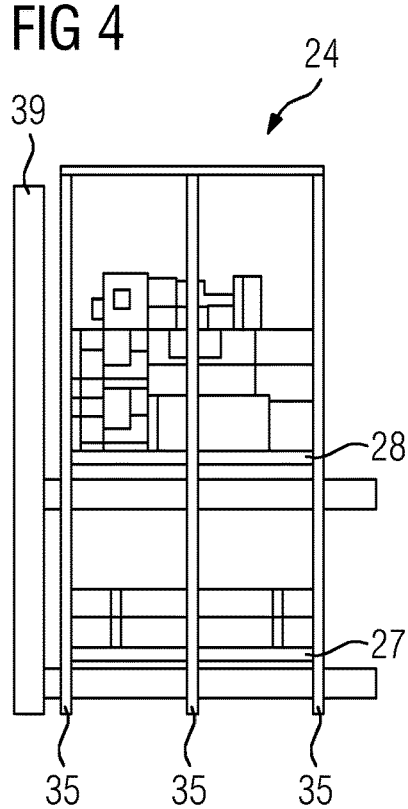
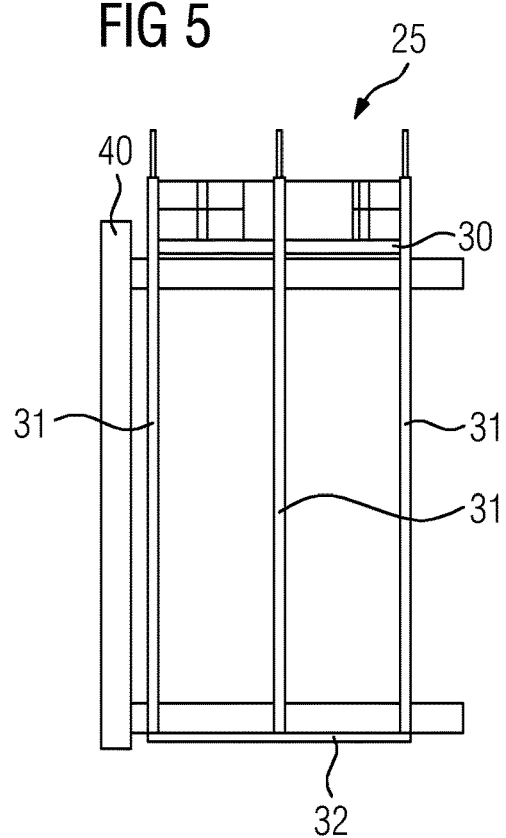

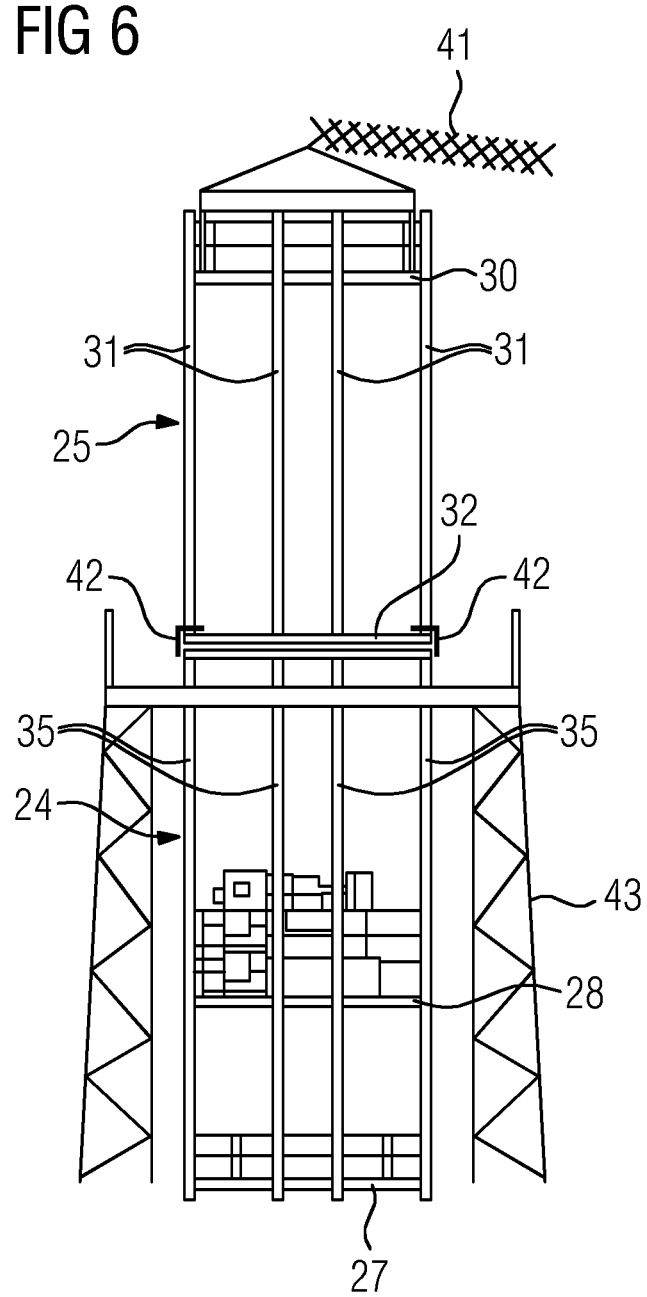

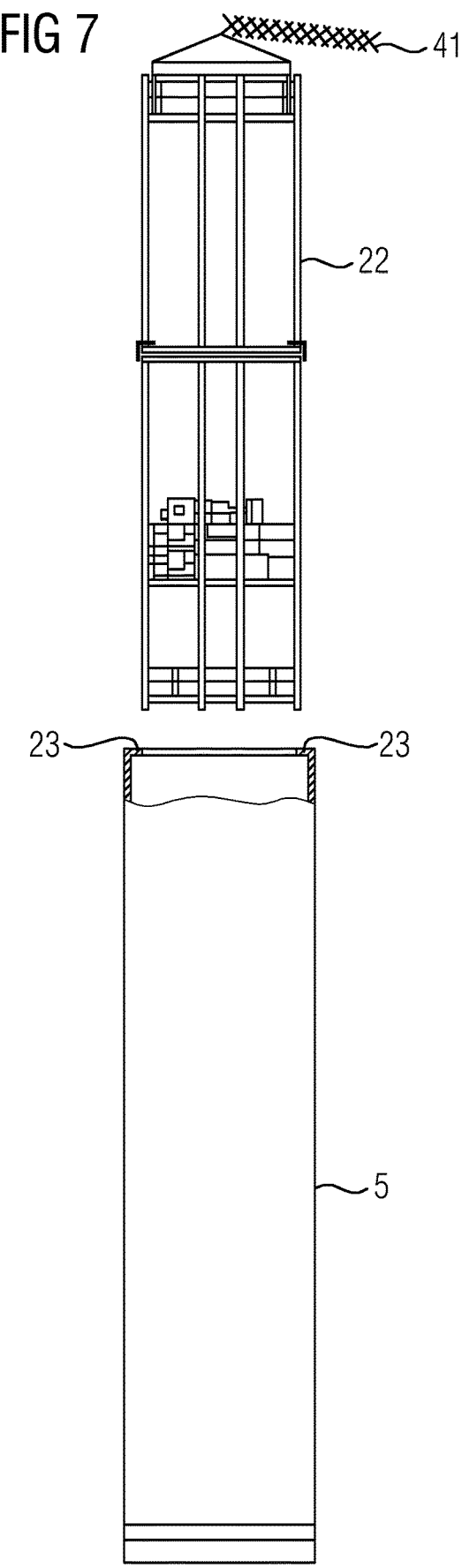

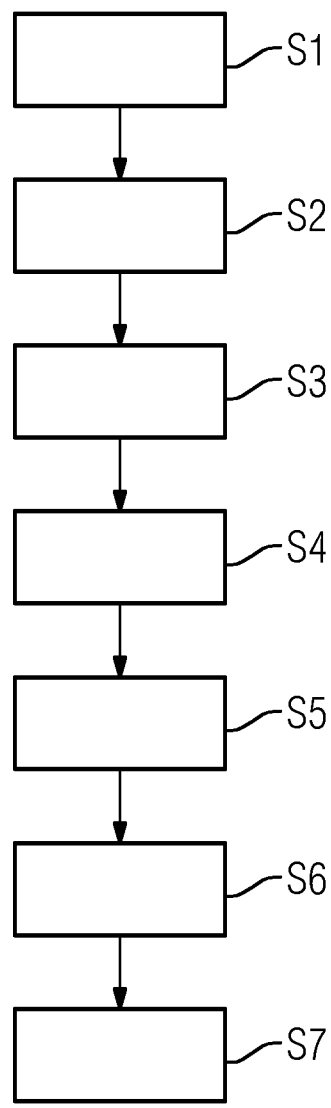

METHOD FOR MANUFACTURING A WIND TURBINE AND WIND TURBINE

CROSS-REFERENCE TO RELATED APPLICATIONS

This application is a national stage entry of PCT Application No. PCT/EP2020/050706 having a filing date of Jan. 13, 2020, which claims priority to European Patent Application No. 19154718.1, having a filing date of Jan. 31, 2019, the entire contents of which are hereby incorporated by reference.

FIELD OF TECHNOLOGY

The following relates to a method for manufacturing a wind turbine and a wind turbine.

BACKGROUND

Wind turbines are increasing in size. This involves also an increase of the size of individual components of the wind turbine. For example, the transition piece connecting the foundation of the wind turbine with the tower of the wind turbine is increasing in size.

The transition piece includes inside several platforms. The platforms can be inserted in the transition piece in two different ways.

According to a first approach, the transition piece is arranged horizontally and the platforms are inserted one by one into the horizontal transition piece and connected one by one with the tower wall of the transition piece. This approach is time-consuming and costly.

According to a second approach, the platforms of the transition piece are assembled to form a platform assembly. The platform assembly is inserted into the transition piece, e.g., by means of a crane, and suspended from the tower wall. This approach reduces the number of connection points with the tower wall, thereby saving time and costs. However, for very high transition pieces, the height of the platform assembly for the transition piece is also increasing. Manufacturing and transporting a very high platform assembly can be difficult, e.g., because of a limited height of a factory hall.

SUMMARY

It is one aspect of the present invention to provide an improved method for manufacturing a wind turbine and an improved wind turbine.

Accordingly, a method for manufacturing a wind turbine is proposed. The method comprises the steps of:
a) manufacturing a bottom module, the bottom module comprising at least one first platform,
b) manufacturing a top module, the top module comprising at least one second platform, and
c) assembling the bottom module and the top module to form a platform assembly.

Manufacturing the platform assembly from two separate modules allows to manufacture a higher platform assembly. In particular, a platform assembly suitable for a higher transition piece may be manufactured.

By way of the above described method, the platform assembly can be freely suspended from a wall portion of the tower or the transition piece. Thereby, the mounting work can be reduced. In particular, the costly individual mounting of separate platforms to the transition piece wall is avoided. Furthermore, decreasing the number of connection points with the transition piece wall reduces the risk of fatigue of the transition piece.

In particular, step a) of manufacturing the bottom module with the at least one first platform is carried out inside a factory hall. Further, step b) of manufacturing the top module with the at least one second platform is, for example, also carried out inside the factory hall. Step c) of assembling the bottom module and the top module to form the platform assembly is carried out, for example, outside the factory hall. This allows to manufacture a platform assembly that has a height greater than the maximum height of the factory hall.

A wind turbine is an apparatus to convert the wind's kinetic energy into electrical energy. The wind turbine comprises, for example, a rotor having one or more blades, a nacelle including a generator and the tower holding, at its top end, the nacelle. The tower of the wind turbine may be connected via the transition piece to a foundation of the wind turbine such as a monopile in the sea bed.

The tower and the transition piece of the wind turbine comprise in its interior two or more platforms, such as the first platform and the second platform. The platforms can be configured for carrying electrical or mechanical devices required for the operation of the wind turbine, such as a low voltage transformer and a switch gear. The platforms can also be configured as a working platform, e.g., for performing work during the assembly of the wind turbine and/or maintenance work during the operation of the wind turbine. An example for a working platform is a bolt platform which is used to bolt tower sections to each other or to the transition piece.

The at least one first platform of the bottom module comprises, in particular, one, two, three or more platforms. The at least one first platform of the bottom module comprises, for example, a switch gear platform and/or a hang-off platform. The switch gear platform is, in particular, a platform on which the switch gear is arranged. The hang-off platform is, for example, a working platform for installation of cables which are connecting the wind turbine to other wind turbines of a wind turbine array.

The at least one second platform of the top module comprises, in particular, one, two, three or more platforms. The at least one second platform of the top module comprises, for example, a bolt platform configured for a worker to bolt the transition piece to the tower, in particular to a bottom tower section.

According to an embodiment, the top module comprises two or more vertical legs, a first horizontal plane at which the two or more vertical legs are connected horizontally, and a second horizontal plane at which the two or more vertical legs are connected horizontally. The first horizontal plane is spaced apart from the second horizontal plane in the vertical direction. The first horizontal plane or the second horizontal plane comprises the at least one second platform, the at least one second platform providing the horizontal connection of the two or more vertical legs.

Each of the two or more vertical legs of the top module is, in particular, continuous, i.e. formed in one-piece.

Each of the two or more vertical legs of the top module comprise, for example, at an upper portion thereof connection means for a connection with a wall portion, e.g., a flange, of the transition piece.

The two or more vertical legs of the top module are connected horizontally at the first horizontal plane such that the two or more vertical legs are stabilized at the first horizontal plane. Likewise, the two or more vertical legs of the top module are connected horizontally at the second horizontal plane such that the two or more vertical legs are stabilized at the second horizontal plane.

By having the horizontal connection of the two or more vertical legs at the first and second horizontal plane, the top module can be manufactured such that it is self-standing. Further, it can be easily transported to a site where it is assembled with the bottom module.

The first horizontal plane is spaced apart from the second horizontal plane in the vertical direction, in particular by a first height. The first height is a height that is sufficiently large in order to have a stable self-standing top module. The first height is, for example, larger than two meters, larger than five meters and/or larger than ten meters.

The two or more vertical legs of the top module are connected, for example, in the second horizontal plane by the second platform, in particular the bolt platform of the transition piece. The second horizontal plane of the top module is, for example, arranged above the first horizontal plane of the top module.

According to a further embodiment, the other one of the first horizontal plane and the second horizontal plane of the top module comprises a plurality of horizontal struts providing the horizontal connection of the two or more vertical legs.

The plurality of struts is, for example, made from metal, in particular steel.

By having the horizontal connection of the two or more vertical legs at one of the first horizontal plane and the second horizontal plane by means of the plurality of struts, a top module comprising only one single platform can be manufactured as a self-standing module.

In an alternative embodiment of the top module, the top module comprises at least two second platforms arranged at the first horizontal plane and the second horizontal plane, respectively. In other words, the top module comprises, instead of struts at one of the first and second horizontal plane, rather platforms at both the first and second horizontal plane.

According to a further embodiment, the bottom module comprises at least two first platforms, two or more vertical legs, a first horizontal plane at which the two or more vertical legs are connected horizontally, and a second horizontal plane at which the two or more vertical legs are connected horizontally. The first horizontal plane is spaced apart from the second horizontal plane in the vertical direction. The first horizontal plane and the second horizontal plane each comprise one of the at least two first platforms, each of the at least two first platforms providing the horizontal connection of the two or more vertical legs.

Each of the two or more vertical legs of the bottom module is, in particular, continuous, i.e. formed in one-piece.

The two or more vertical legs of the bottom module are connected horizontally at the first horizontal plane such that the two or more vertical legs are stabilized at the first horizontal plane. Likewise, the two or more vertical legs of the bottom module are connected horizontally at the second horizontal plane such that the two or more vertical legs are stabilized at the second horizontal plane.

By having the horizontal connection of the two or more vertical legs at the first and second horizontal plane, the bottom module can be manufactured such that it is self-standing. Further, it can be easily transported to a site where it is assembled with the top module.

The first horizontal plane of the bottom module is spaced apart from the second horizontal plane of the bottom module in the vertical direction, in particular by a second height. The second height is a height that is sufficiently large in order to have a stable self-standing bottom module. The second height is, for example, larger than two meters, larger than five meters and/or larger than ten meters.

For the bottom module, the horizontal connection of the two or more vertical legs is provided in both the first horizontal plane and the second horizontal plane by one of the at least two first platforms. For example, the horizontal connection of the two or more vertical legs of the bottom module is provided in the first horizontal plane by the hang-off platform. Further, the horizontal connection of the two or more vertical legs of the bottom module is provided in the second horizontal plane by the switch gear platform. The second horizontal plane of the bottom module is, for example, arranged above the first horizontal plane of the bottom module.

In an alternative embodiment of the bottom module, one of the first horizontal plane and the second horizontal plane of the bottom module comprises—instead of the first platform—a plurality of horizontal struts providing the horizontal connection of the two or more vertical legs.

According to a further embodiment, the bottom module and the top module are assembled by aligning and connecting the bottom module with the top module, in particular by aligning and connecting two or more vertical legs of the bottom module with two or more vertical legs of the top module.

The bottom module and the top module are, for example, assembled outside the factory hall in which they have been manufactured and/or at a harbor site.

For assembling, a bottom portion of each of the two or more vertical legs of the top module is, for example, aligned with a corresponding top portion of each of the two or more vertical legs of the bottom module. The bottom module and the top module are connected with each other, in particular, by means of connection means.

According to a further embodiment, the bottom module is aligned with the top module by means of backing plates connected with the two or more vertical legs of the bottom module and/or the two or more vertical legs of the top module.

Having the backing plates allows to more precisely align the bottom module and the top module.

According to a further embodiment, the method comprises the step of inserting the platform assembly into a transition piece of the wind turbine, in particular by means of a crane. The transition piece is configured for connection with a foundation of the wind turbine.

According to a further embodiment, the method comprises the step of connecting the platform assembly to a wall portion, in particular a flange, of the transition piece to suspend the platform assembly from the wall portion.

The platform assembly is, for example, suspended from the flange such that it is hanging freely from the flange. In particular, apart from the flange the platform assembly is not connected to any further wall portion of the transition piece.

For example, a top portion of each of the two or more vertical legs of the top module of the platform assembly is connected with the flange of the transition piece. Alternatively, also separate struts and/or arms can be used to connect the platform assembly with the flange. For example, the separate struts can connect the top most platform of the platform assembly, such as the second platform, with the flange.

By connecting the platform assembly to the transition piece wall portion and suspending the platform assembly from the wall portion, several or all platforms required in the transition piece can be connected to the transition piece in one step without the need to connect every single platform to the transition piece wall portion.

According to a further embodiment, the at least one first platform and/or the at least one second platform comprises one or more pivotable edge elements. Further, the method comprises the step of pivoting the one or more pivotable edge elements so as to bridge a gap between the at least one first platform and/or the at least one second platform and an adjacent wall portion.

The platform assembly is, after assembling, inserted into the transition piece. This requires that the diameter of the platform assembly, in particular, the diameter of the at least one first platform and the at least one second platform, is small enough to fit through the narrowest portion of the transition piece. The narrowest portion of the transition piece is, for example, at the flange of the transition piece. Hence, in the inserted state, there is a gap between each of the at least one first platform and the at least one second platform and the corresponding adjacent interior wall portion of the transition piece.

Having the one or more pivotable edge elements and pivoting them to bridge the gap between the at least one first platform and/or the at least one second platform and the adjacent wall portion allows to increase the functionality and the safety of the wind turbine. In particular, it allows to prevent items, such as devices, from falling through the gap.

According to a further embodiment, the one or more pivotable edge elements are each connected to a main body of the at least one first platform and/or the at least one second platform.

The one or more pivotable edge elements are, in particular connected to the main body of the at least one first platform and/or the at least one second platform by means of bolts such that the pivotable edge elements are pivoted about the bolts.

According to a further embodiment, the method comprises the step of transporting, in particular by means of a vessel, the transition piece including the platform assembly produced in accordance with steps a) to c) to a wind harvesting site.

Thus, it is possible to have the platform assembly installed inside the transition piece which is, for example, a "Super Extended Transition Piece" with a height of 40 meters or more, when transporting the transition piece, in particular in a vertical position, to the wind harvesting site.

According to a further aspect, a wind turbine is provided. The wind turbine comprises a platform assembly. The platform assembly includes a bottom module with at least one first platform and a top module with at least one second platform.

According to an embodiment of the further aspect, the top module comprises two or more vertical legs, a first horizontal plane at which the two or more vertical legs are connected horizontally, and a second horizontal plane at which the two or more vertical legs are connected horizontally. The first horizontal plane is spaced apart from the second horizontal plane in the vertical direction. The first horizontal plane or the second horizontal plane comprises the at least one second platform, the at least one second platform providing the horizontal connection of the two or more vertical legs.

According to a further embodiment of the further aspect, the other one of the first horizontal plane and the second horizontal plane of the top module comprises a plurality of horizontal struts providing the horizontal connection of the two or more vertical legs.

According to a further embodiment of the further aspect, the bottom module comprises at least two first platforms, two or more vertical legs, a first horizontal plane at which the two or more vertical legs are connected horizontally, and a second horizontal plane at which the two or more vertical legs are connected horizontally. The first horizontal plane is spaced apart from the second horizontal plane in the vertical direction. The first horizontal plane and the second horizontal plane each comprise one of the at least two first platforms, each of the at least two first platforms providing the horizontal connection of the two or more vertical legs.

The embodiments and features described with reference to the method of the present invention apply mutatis mutandis to the wind turbine of the present invention.

Further possible implementations or alternative solutions of the present invention also encompass combinations—that are not explicitly mentioned herein—of features described above or below with regard to the embodiments. The person skilled in the art may also add individual or isolated aspects and features to the most basic form of the present invention.

BRIEF DESCRIPTION

Some of the embodiments will be described in detail, with reference to the following figures, wherein like designations denote like members, wherein:

FIG. 4 illustrates a process step for manufacturing a bottom module of the platform assembly of FIG. 2;

FIG. 5 illustrates a process step for manufacturing a top module of the platform assembly of FIG. 2;

FIG. 6 illustrates a process step for assembling the bottom module of FIG. 4 and the top module of FIG. 5 to form the platform assembly of FIG. 2;

FIG. 7 illustrates a process step for inserting the platform assembly of FIG. 2 into a transition piece of the wind turbine of FIG. 1;

FIG. 12 shows a flowchart illustrating a method for manufacturing a wind turbine according to an embodiment.

DETAILED DESCRIPTION

Figure 1:
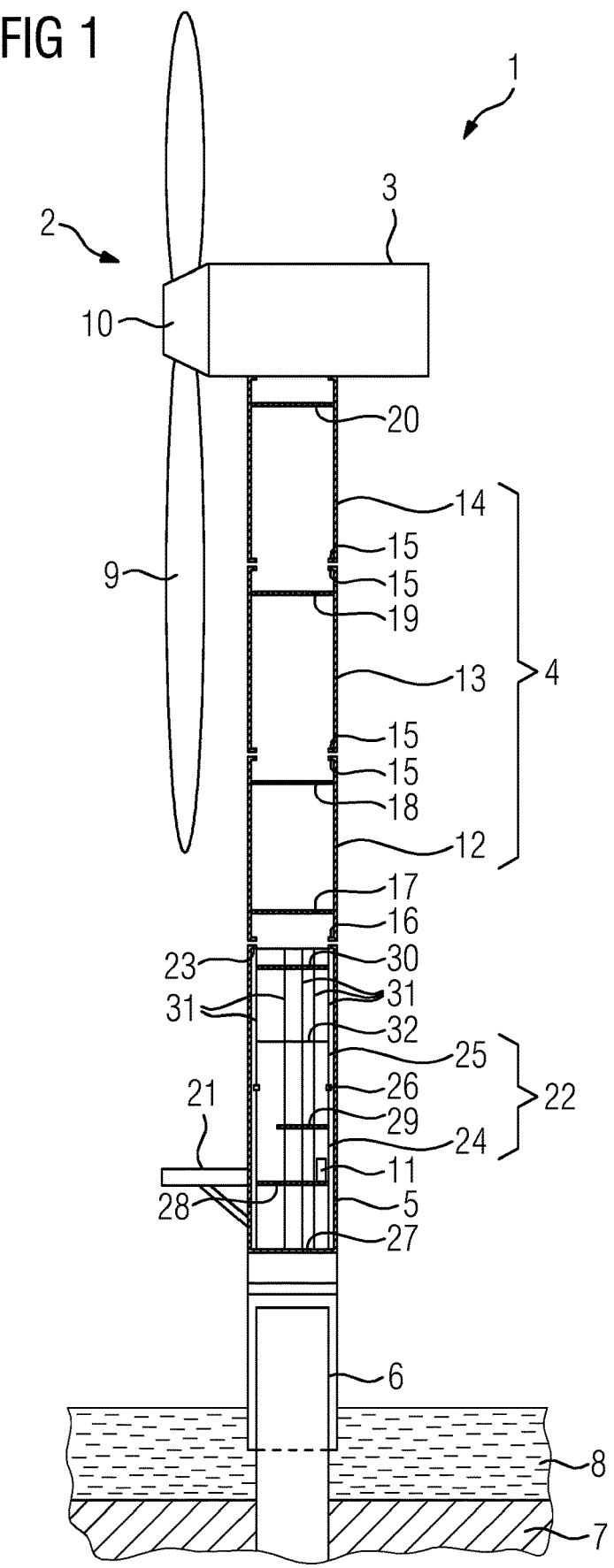
FIG. 1 shows, in partial cross-section, a wind turbine according to an embodiment.

In the Figures, like reference numerals designate like or functionally equivalent elements, unless otherwise indicated.

FIG. 1 shows an offshore wind turbine 1 according to an embodiment.

The wind turbine 1 comprises a rotor 2 connected to a generator (not shown) arranged inside a nacelle 3. The nacelle 3 is arranged at the upper end of a tower 4 of the wind turbine 1. The tower 4 is arranged on a transition piece 5. The transition piece 5 is a "Super Extended Transition Piece" with a height of 40 meters or more. The transition piece 5 is erected on a monopile 6 which is driven into the sea bed 7 and is partly above the level of the sea water 8.

The rotor 2 comprises, for example, three rotor blades 9. The rotor blades 9 are connected to a hub 10 of the wind turbine 1. A shaft (not shown) connects the hub 10 to the generator.

The generator is electrically connected to a switch gear 11 in the transition piece 5 by means of a high voltage cable (not shown).

The tower 4 comprises one or more tower sections 12, 13, 14. In the example of FIG. 1, the tower 4 comprises a bottom tower section 12, a middle tower section 13, and a top tower section 14. The tower sections 12, 13, 14 include each one or more flanges 15 bolted to a corresponding flange 15 of another tower section 12, 13, 14. Further, the bottom tower section 12 of the tower 4 includes a flange 16 bolted to the transition piece 5.

The tower 4 comprises inside one or more platforms 17, 18, 19, 20. The tower 4 comprises, for example, a low voltage platform 17 in the bottom tower section 12 on which a low voltage transformer (not shown) is located. The tower 4 may further comprise bolt platforms 18 and 19 configured for a worker to bolt the corresponding tower sections 12, 13, 14 to each other when assembling the tower 4.

The transition piece 5 comprises on its outside a landing platform 21 to provide access to the interior of the transition piece 5 and the tower 4. The transition piece 5 comprises further a platform assembly 22 suspended from a flange 23 of the transition piece 5. The flange 23 of the transition piece 5 is bolted to the flange 16 of the tower 4.

Figure 2:
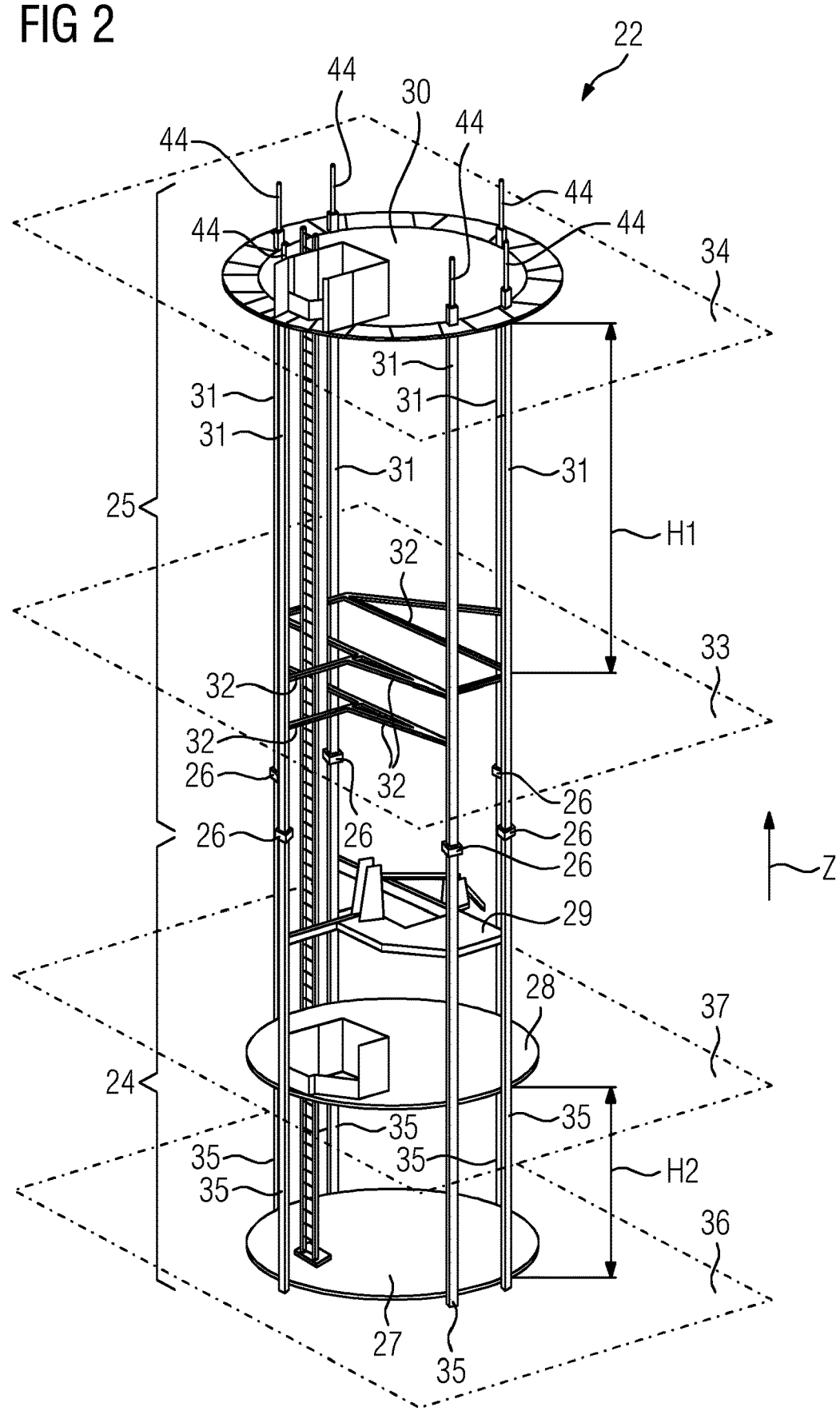
FIG. 2 shows a perspective view of a platform assembly of the wind turbine of FIG. 1.

The platform assembly 22 comprises a bottom module 24 and a top module 25. The bottom module 24 and the top module 25 are connected to each other by connecting means 26. FIG. 2 shows a perspective enlarged view of the platform assembly 22 of FIG. 1

The bottom module 24 comprises at least one first platform 27, 28. In the example of FIGS. 1 and 2, the bottom module 24 comprises a hang-off platform 27 and a switch gear platform 28 on which the switch gear 11 is arranged. Furthermore, the bottom module 24 may comprise above the switch gear platform 28 a switch gear footbridge 29.

The top module 25 comprises at least one second platform 30. In the example of FIGS. 1 and 2, the top module 25 comprises a bolt platform 30 for a worker to connect the transition piece 5 and the tower 4 by means of bolting the flanges 16 and 23 to each other. Furthermore, the top module 25 comprises two or more vertical legs 31 and a plurality of struts 32 connecting the two or more vertical legs 31.

As can be seen in FIG. 2, the top module 25 comprises e.g., six vertical legs 31. Furthermore, the top module 25 comprises a first horizontal plane 33 at which the six vertical legs 31 are connected horizontally by means of the plurality of horizontal struts 32. Further, the top module 25 comprises a second horizontal plane 34 at which the six vertical legs 31 are connected horizontally by means of the bolt platform 30. The first horizontal plane 33 is spaced apart from the second horizontal plane 34 in the vertical direction Z by a first height H1. The first height H1 is, for example, larger than two meters, larger than five meters and/or larger than ten meters.

The bottom module 24 comprises six vertical legs 35. Furthermore, the bottom module 24 comprises a first horizontal plane 36 at which the six vertical legs 35 are connected horizontally by means of the hang-off platform 27. Further, the bottom module 24 comprises a second horizontal plane 37 at which the six vertical legs 35 are connected horizontally by means of the switch gear platform 28. The first horizontal plane 36 is spaced apart from the second horizontal plane 37 in the vertical direction Z by a second height H2. The second height H2 is, for example, larger than two meters, larger than five meters and/or larger than ten meters.

In the following, a method for manufacturing the wind turbine 1 of FIG. 1 is described with respect to FIGS. 3-12.

Figure 3:
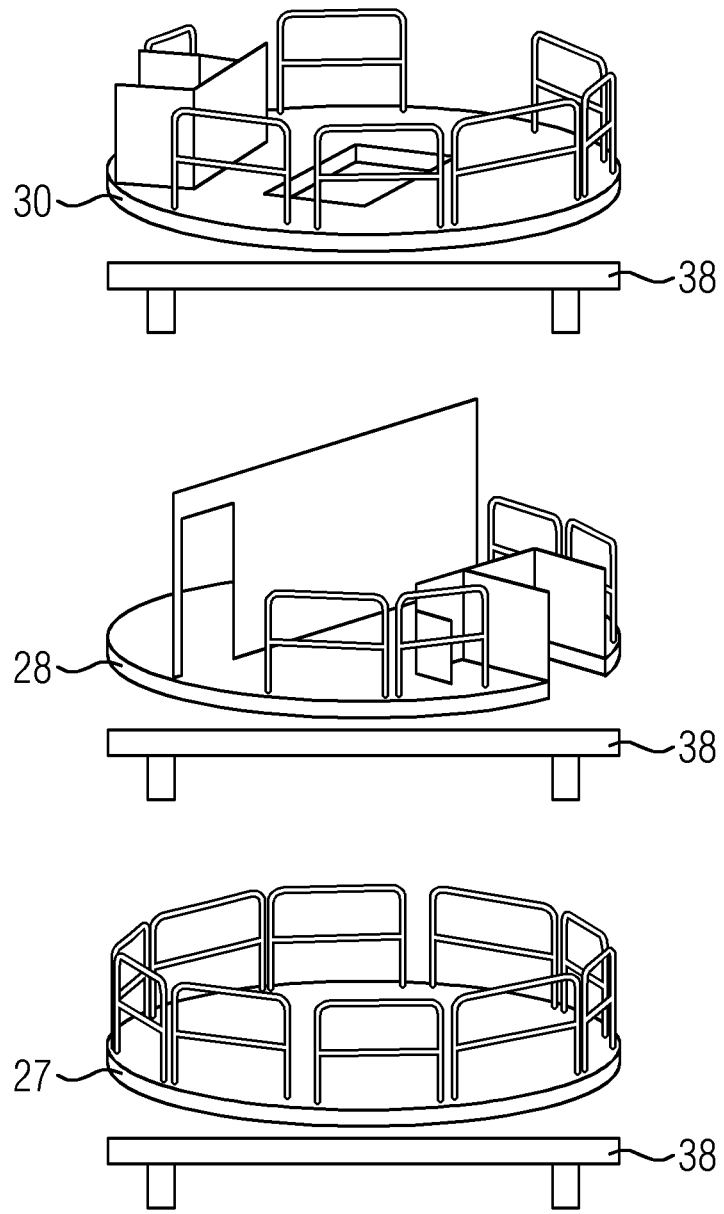
FIG. 3 illustrates a process step for manufacturing individual platforms of the platform assembly of FIG. 2.

In step S1 of the method, the bottom module 24 is manufactured. FIG. 3 illustrates the manufacturing of the individual platforms 27, 28, 30 of the bottom module 24 and of the top module 25 at separate fixtures (stands) 38 within a factory hall. FIG. 4 illustrates the manufacturing of the bottom module 24 at a fixture (stand) 39 within the factory hall. The hang-off platform 27 and the switch gear platform 28 are each arranged on horizontal portions of the fixture 39 so as to extend horizontally. Then, the six vertical legs 35 are connected to the hang-off platform 27. Further, the six legs 35 are connected to the switch gear platform 28.

In step S2 of the method, the top module 25 is manufactured at a fixture (stand) 40 in the factory hall, as shown in FIG. 5. The bolt platform 30 is laid on a horizontal portion of the fixture 40. Then, the six legs 31 are provided and connected horizontally at the second horizontal plane 34 comprising the bolt platform 30. Further, the six legs 31 are connected horizontally at the first horizontal plane 33 by means of the plurality of struts 32.

Both, the bottom module 24 and the top module 25 are self-supporting due to having each the two spaced apart horizontal connections of their legs 31, 35.

In step S3 of the method, the bottom module 24 and the top module 25 are assembled to form the platform assembly 22, as shown in FIG. 6. The bottom module 24 and the top module 25 are transported to outside the factory hall. The top module 25 is lifted by a crane 41 above the bottom module 24. The vertical legs 31 of the top module 25 comprise each a backing plate 42. The top module 25 is aligned with the bottom module 24 by means of the backing plates 42. The bottom module 24 and the top module 25 are connected with each other by means of the connection means 26. The backing plates 42 can, for example, serve as the connection means 26. The alignment and connection of the modules 24, 25 may be supported by a worker standing on a platform of a scaffolding 43.

In step S4 of the method, the platform assembly 22 is inserted into the transition piece 5 of the wind turbine 1 by means of the crane 41. As shown in FIG. 7, the platform assembly 22 is lifted by the crane 41 and inserted from above into the vertical transition piece 5.

In step S5 of the method, the platform assembly 22 is connected to the flange 23 of the transition piece 5 to suspend the platform assembly 22 from the flange 23.

In particular, arms 44 (FIG. 2) of the top module 25 are connected with the flange 23, e.g., by means of bolts. Thus, in this example, the platform assembly 22 is supported by the flange 23 at six connection points. From these six connection points, the platform assembly 22 is hanging free into the transition piece 5, i.e. has no other connections providing support in the vertical direction Z.

Figure 9:
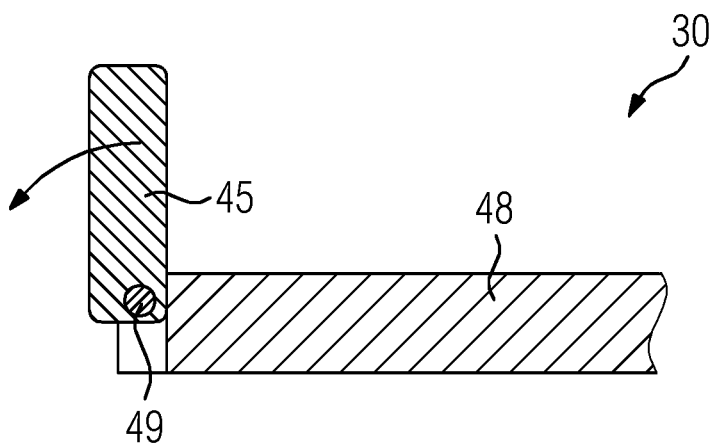
FIG. 9 shows, in cross-section, an enlarged partial view of FIG. 8.
Figure 10:
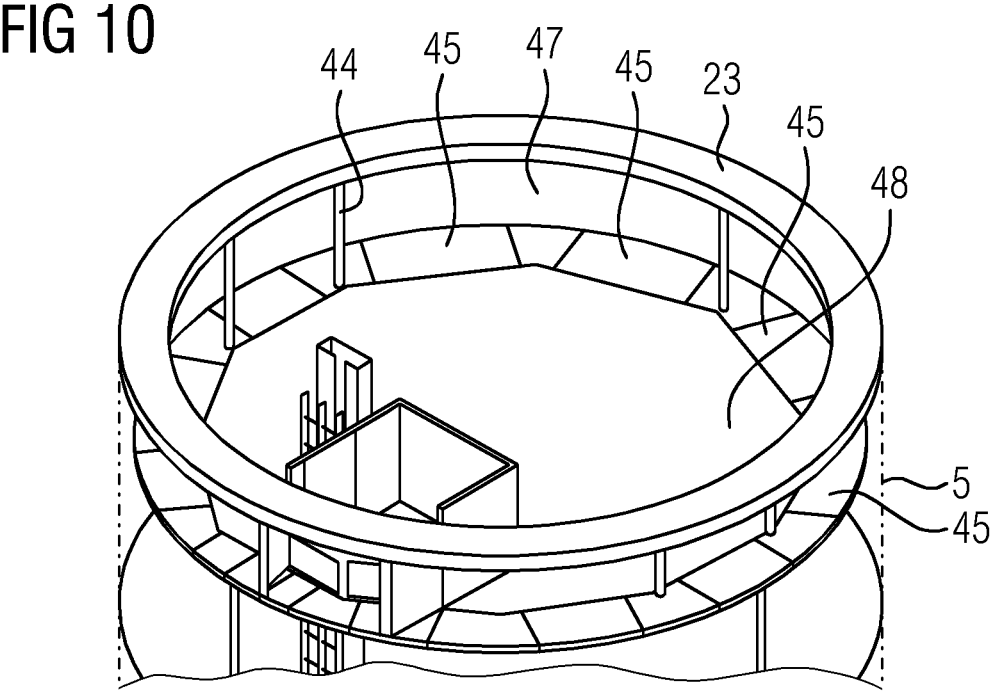
FIG. 10 shows a similar view as FIG. 8 but with the pivotable edge elements pivoted outwards.
Figure 11:
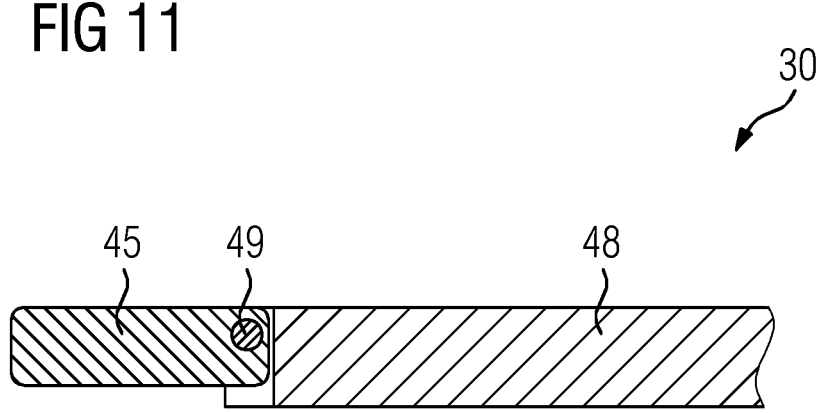
FIG. 11 shows, in cross-section, an enlarged partial view of FIG. 10.

In step S6 of the method, pivotable edge elements 45 of the bolt platform 30 are pivoted so as to bridge a gap 46 between the bolt platform 30 and an adjacent wall portion 47, as shown in FIGS. 9 to 11.

Figure 8:
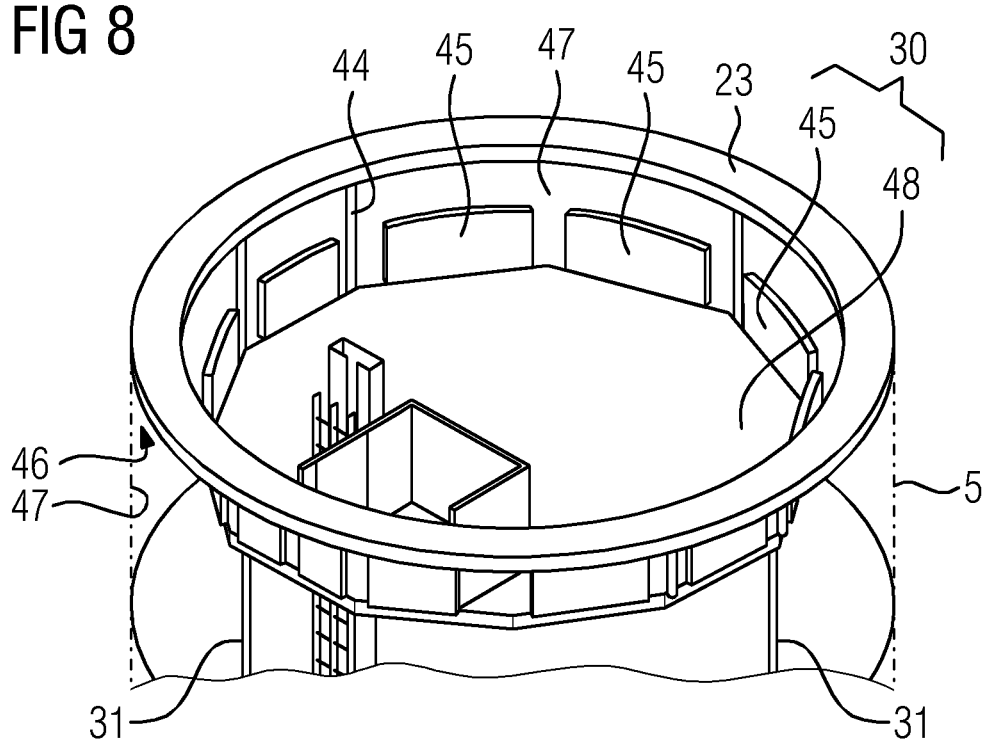
FIG. 8 shows a detailed view of a bolt platform of the platform assembly of FIG. 2 with a pivotable edge element.

FIG. 8 shows the bolt platform 30 as part of the platform assembly 22. The bolt platform 30 comprises a main body 48 and the pivotable edge elements 45. Further, there is the gap 46 between the main body 48 of the bolt platform 30 and the adjacent wall portion 47 because the diameter of the main body 48 of the bolt platform 30 is smaller than the diameter of the interior wall of the transition piece 5, in particular at the adjacent wall portion 47. To avoid items to fall from the bolt platform 30 through the gap 46, the gap 46 is (partly) closed in the method by means of pivoting the pivotable edge elements 45.

FIG. 9 shows an enlarged cross-section view of a portion of the bolt platform 30. The pivotable edge elements 45 is connected to the main body 48 of the bolt platform 30 by means of bolts 49.

To bridge the gap 46, the pivotable edge elements 45 are pivoted outwards, as shown in FIG. 10 and, as enlarged cross-section view, in FIG. 11. The pivotable edge elements 45 are pivoted outwards by pivoting them about the bolts 49.

Although the present invention has been described in accordance with preferred embodiments, it is obvious for the person skilled in the art that modifications are possible in all embodiments.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A method for manufacturing a wind turbine, the method comprising:
    a) manufacturing a bottom module, the bottom module comprising at least one first platform and two or more vertical legs that are connected together by a first horizontal connection and are located radially outward of the at least one first platform;
    b) manufacturing a top module separate from the manufacturing of the bottom module, the top module comprising at least one second platform and two or more vertical legs that are connected together by a second horizontal connection; and
    c) assembling the bottom module and the top module to form a platform assembly, wherein the two or more legs of the top module are separate from the two or more vertical legs of the bottom module;
    wherein the bottom module and the top module are assembled by aligning and connecting the bottom module with the top module by aligning and connecting the two or more vertical legs of the bottom module with the two or more vertical legs of the top module radially outward of the last one first platform of the bottom module;
    wherein the top module includes a plurality of horizontal struts connecting the two or more vertical legs of the top module together, the two or more vertical legs of the top module and/or the two or more vertical legs of the bottom module including backing plates, further wherein the two or more vertical legs of the top module are aligned and connected to the two or more vertical legs of the bottom module using the backing plates.

2. The method according to claim 1, wherein:
    the top module further comprises a first horizontal plane at which the two or more vertical legs are connected horizontally by the first horizontal connection, and a second horizontal plane at which the two or more vertical legs are connected horizontally by the at least one second platform, the first horizontal plane being spaced apart from the second horizontal plane in a vertical direction.

3. The method according to claim 2, wherein the plurality of horizontal struts are located at the first horizontal plane of the top module.

4. The method according to claim 1, wherein:
    the bottom module further comprises at least two first platforms, a first horizontal plane at which the two or more vertical legs are connected horizontally by the second horizontal connection, and a second horizontal plane at which the two or more vertical legs are connected horizontally by the at least one platform of the at least two platforms, the first horizontal plane being spaced apart from the second horizontal plane in a vertical direction.

5. The method according to claim 1, comprising the step of inserting the platform assembly into a transition piece of the wind turbine with a crane, the transition piece being configured for connection with a foundation of the wind turbine.

6. The method according to claim 5, comprising the step of connecting the platform assembly to a flange of the transition piece to suspend the platform assembly from the flange.

7. The method according to claim 1, wherein the at least one first platform and/or the at least one second platform comprises one or more pivotable edge elements, and wherein the method comprises the step of pivoting the one or more pivotable edge elements so as to bridge a gap between the at least one first platform and/or the at least one second platform and an adjacent wall portion.

8. The method according to claim 7, wherein the one or more pivotable edge elements are each connected to a main body of the at least one first platform and/or the at least one second platform.

9. The method according to claim 1, comprising the step of transporting, with a vessel, the transition piece including the platform assembly produced in accordance with steps a) to c) to a wind harvesting site.

10. The method according to claim 1, wherein the backing plates are located at a same horizontal plane as the plurality of struts.

11. A wind turbine, comprising a platform assembly, the platform assembly including a bottom module with at least one first platform and two or more vertical legs that are connected together by a first horizontal connection and a top module with at least one second platform and two or more vertical legs that are connected together by a second horizontal connection, wherein the bottom module and the top module are separately manufactured modules;
    wherein the bottom module and the top module are assembled by aligning and connecting the bottom module with the top module by aligning and connecting the two or more vertical legs of the bottom module with the two or more vertical legs of the top module radially outward of the last one first platform of the bottom module;
    wherein the top module includes a plurality of horizontal struts connecting the two or more vertical legs of the top module together, the two or more vertical legs of the top module and/or the two or more vertical legs of the bottom module including backing plates, further wherein the two or more vertical legs of the top module are aligned and connected to the two or more vertical legs of the bottom module using the backing plates.

12. The wind turbine according to claim 11, wherein:
the top module further comprises a first horizontal plane at which the two or more vertical legs are connected horizontally by the first horizontal connection, and a second horizontal plane at which the two or more vertical legs are connected horizontally by the at least one second platform, the first horizontal plane being spaced apart from the second horizontal plane in a vertical direction.

13. The wind turbine according to claim 12, wherein the plurality of horizontal struts are located at the first horizontal plane of the top module.

14. The wind turbine according to claim 11, wherein:
the bottom module further comprises at least two first platforms, a first horizontal plane at which the two or more vertical legs are connected horizontally by the second horizontal connection, and a second horizontal plane at which the two or more vertical legs are connected horizontally by at least one platform of the at least two first platforms, the first horizontal plane being spaced apart from the second horizontal plane in a vertical direction.

\* \* \* \* \*